J. A. DYBLIE.
SLOTTING MACHINE FOR SPLICE BARS.
APPLICATION FILED OCT. 13, 1919.

1,381,110.

Patented June 14, 1921.
4 SHEETS—SHEET 1.

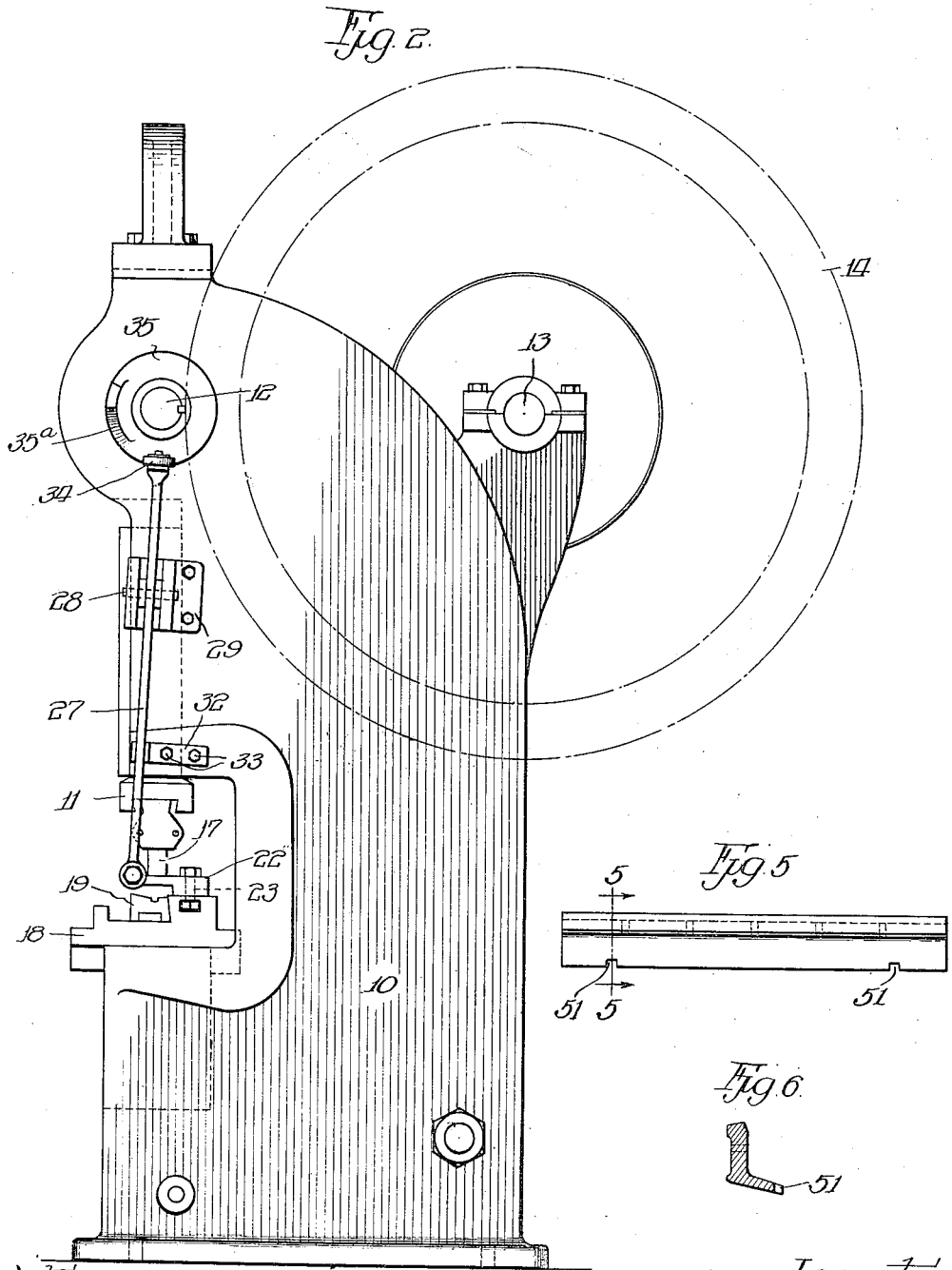

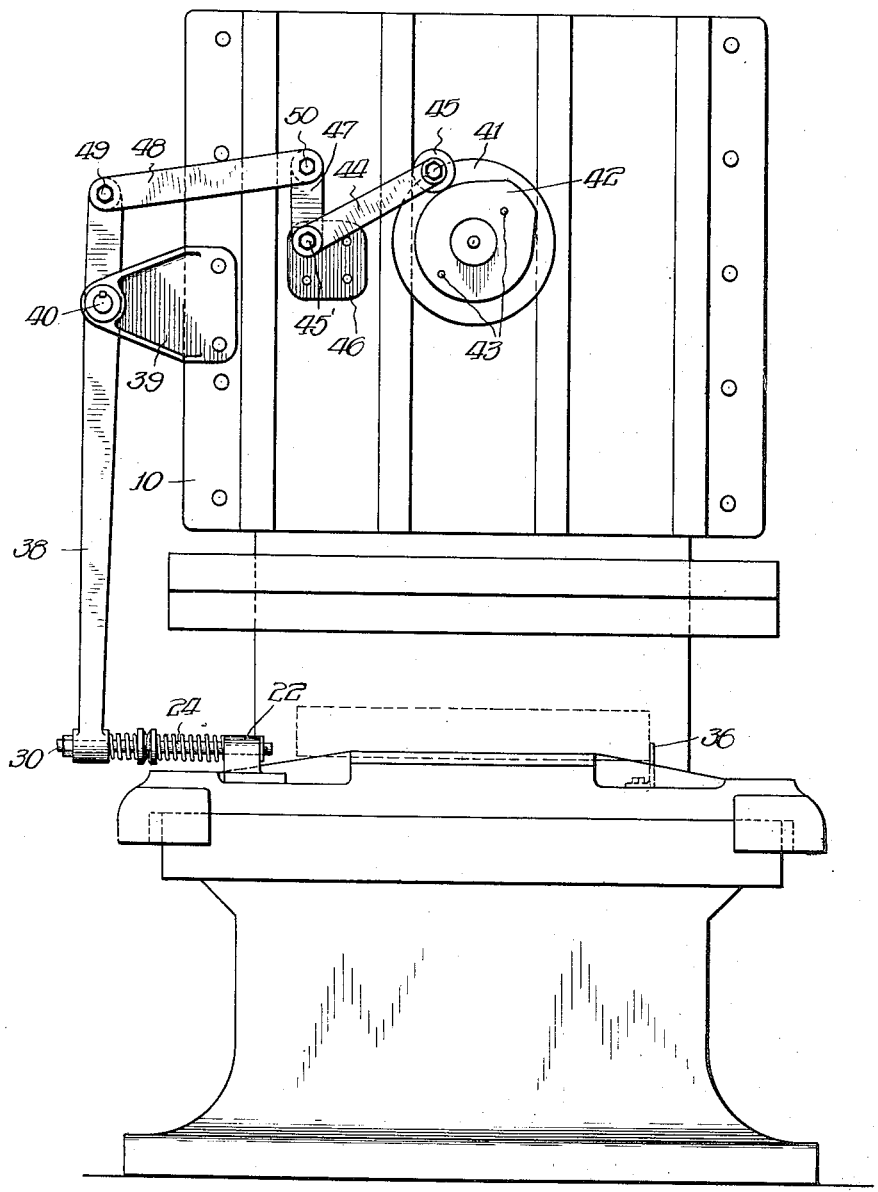

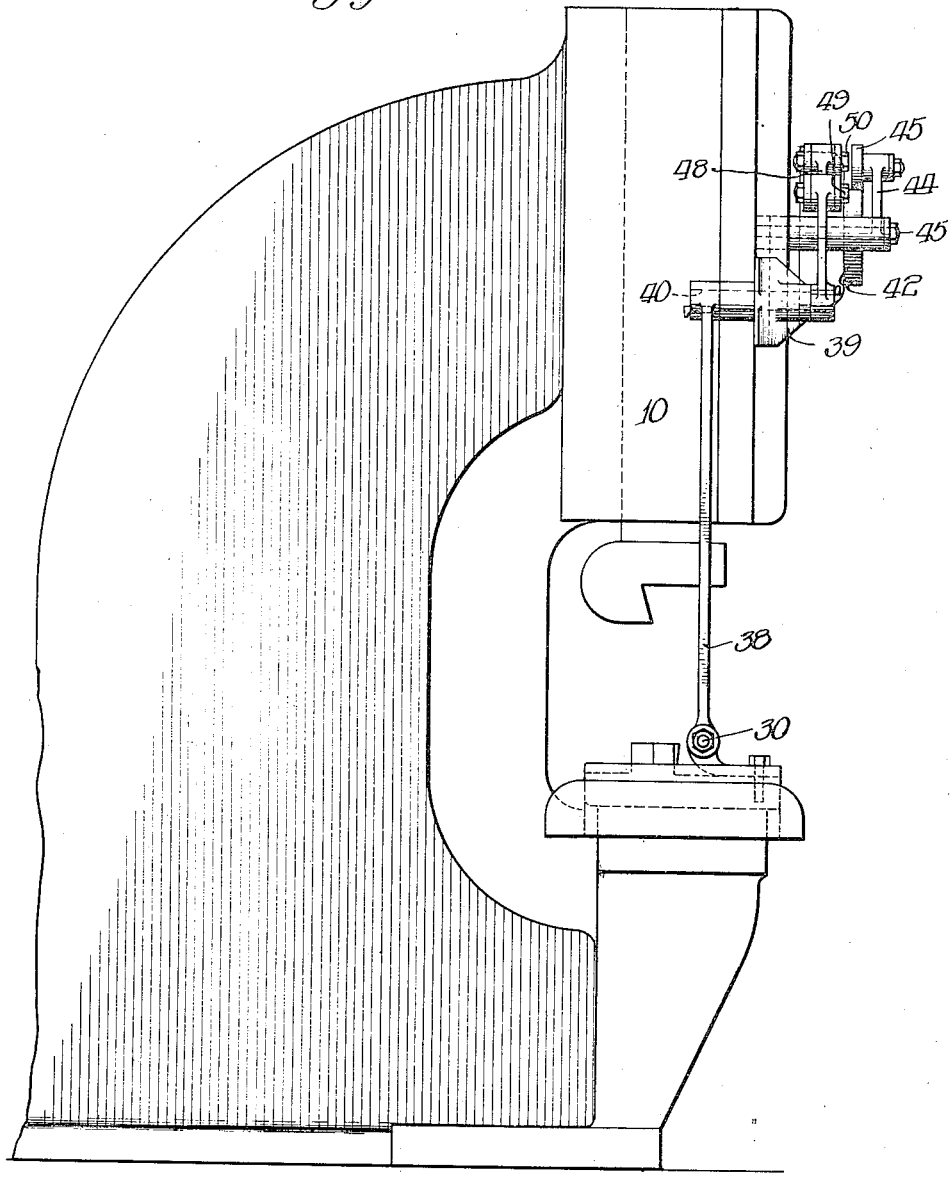

UNITED STATES PATENT OFFICE.

JULIUS A. DYBLIE, OF JOLIET, ILLINOIS.

SLOTTING-MACHINE FOR SPLICE-BARS.

1,381,110.  Specification of Letters Patent.  Patented June 14, 1921.

Application filed October 13, 1919. Serial No. 330,425.

*To all whom it may concern:*

Be it known that I, JULIUS A. DYBLIE, a citizen of the United States, residing at Joliet, in the county of Will and State of Illinois, have invented certain new and useful Improvements in Slotting-Machines for Splice-Bars, of which the following is a specification.

My invention relates to improvements in slotting machines for splice bars and has particular reference to an apparatus for pushing the splice bar into proper position under the slotting punches and holding the said bar while the slotting operation takes place. Heretofore in slotting splice bars which consists in cutting recesses in the base of the splice bar within which the spikes are positioned for securing the rails to the ties, the practice has been to handle the bars with tongs and for the workmen to hold them in position with tongs while the slotting or punching takes place. The slotting operation is accomplished while the bars are hot and therefore it is difficult to properly handle and hold them in proper position. It is necessary that these slots be properly positioned with respect to the bolt holes through the bar and through which bolts are placed, otherwise they would be rejected as unfit for use. These slotting machines run continuously and the bars have to be placed in position for slotting between the strokes of the machine and at the rate of two or three hundred bars per hour, so that it is evident with the placing of the bars by hand with tongs and holding them in position results in many imperfect bars which have to be scrapped. A very large saving has been accomplished in the making of perfect bars, where otherwise the bars would be so imperfect they would be scrapped.

Another object of the invention is the provision of a device which will add materially to the safety of an operator in handling these bars, in addition to the factor of comfort also involved.

Another and further object of the invention is the provision of a device which is entirely automatic in its action and which obviates the necessity of handling the angle or splice bars during one stage of the operation.

Another and further object of the invention is the provision of a device of the character described which would be simple and efficient in operation and which can easily be attached to machines used for slotting splice bars.

My invention will be further and better understood by reference to the accompanying drawings, in which:—

Fig. 2 is a side elevation of a slotting machine;

Fig. 3 is a front view in elevation showing a modified form of my improved invention;

Fig. 4 is a side view in elevation of the machine shown in Fig. 3;

Fig. 5 is a top view of a splice bar, and

Fig. 6 is a sectional view of a splice bar on lines 5—5 of Fig. 5.

Figure 1:
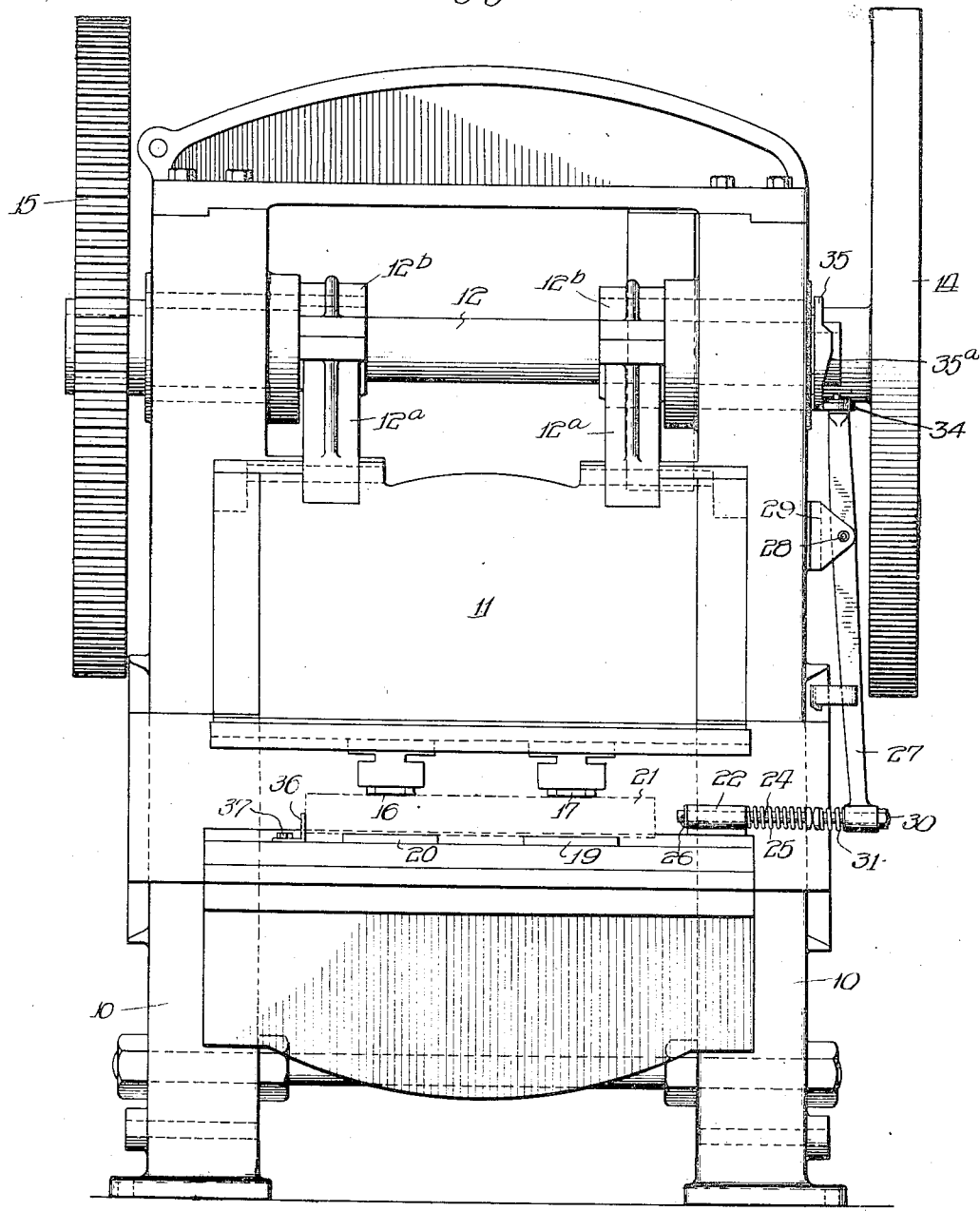
Figure 1 is a front view in elevation of a slotting machine showing my improved invention.

Referring now specifically to the drawings, and particularly to Figs. 1 and 2, frame 10 is shown having a shaft 12 mounted therein, the said shaft 12 carrying a head 11 secured to the shaft 12 and adapted to slide in the frame 10. Mounted in the rear side of the frame 10 is a shaft 13 having a belt wheel 14 mounted thereon and through which the power is transmitted to the machine. Mounted on the shaft 13 on the opposite side of the frame is a small gear wheel (not shown) which meshes with a large gear wheel 15 mounted upon the shaft 12 to which the head 11 is secured. Reciprocating eccentrics are mounted upon the shaft 12, arms 12ª being provided to which bearing caps 12ᵇ are secured to provide means for reciprocating the head 11, the said arms 12ª being integral with the head 11. Secured to the head 11 is a pair of slotting tools 16 and 17 which are adapted to punch out the slots in the splice bars as the head 11 of the machine descends. A table 18 having a pair of die blocks 19 and 20 secured thereto in any suitable manner is provided, the said table 18 being secured to the frame 10 directly underneath the slotting tools 16 and 17. A splice bar 21 is shown in position on the die blocks 19 and 20 which are secured to the table 18. A member 22 which is secured to the table 18 by means of a bolt 23 serves as a guide for a push rod 24 which projects through the member 22. A spring 25 is carried by the push rod 24 and which is interposed between the head of the push rod and the member 22. A pin 26 extends through the forward end of the push rod 24 to prevent the spring 25 from forcing the push rod 24 through the member 22. A lever 27 which is fulcrumed upon a pin 28 carried by a bracket 29 which is secured to the frame 10 of the machine in any approved manner, carries at its lower end a bolt 30 which has a spring 31 interposed between the head of the bolt and the lever 27. The head of the bolt 30 abuts against the push rod 24 heretofore described. A guide 32 is provided which is secured to the frame by means of bolts 33 and serves to hold the lower end of the lever 27 in proper position. The upper end of the lever 27 carries a roller 34 which is in frictional contact with the face of a disk 35 which is secured to the outer end of the shaft 12. The disk 35 has a cam surface, as indicated at 35$^a$, so that as the shaft 12 rotates through the action of the springs on the push rod 24 and bolt 30 the roller 34 is kept in contact with the face of the disk 35. A stop 36 is secured to the table by means of the bolt 37 for the purpose of providing means against which the splice bars abut, as hereinafter described.

Referring now specifically to Figs. 3 and 4 in which a modified form of my invention is shown, I provide a lever 38 which carries the spring bolt 30 at its lower end and abuts against the push rod 24 which is carried by the holder 22 in the same manner as my preferred embodiment, as heretofore described. The lever 38 is pivotally mounted in a bracket 39 which is secured to the frame 10 of the machine in any suitable manner. A pin 40 extends through the outer end of the bracket 39 and through the lever 38 so as to provide a pivotal mounting for the said lever. A disk 41 is mounted upon the outer end of the shaft 12 which operates the sliding head 11 to which the slotting tools 16 and 17 are secured, the said disk 41 carrying an eccentric member 42 which is secured to the disk 41 by means of rivets 43. A bell crank 44 carrying a roller 45 adapted to contact with the cam member 42 is pivotally mounted upon a bolt 45' carried by a member 46 secured to the frame 10 of the machine. To the upper end of the bell crank 44 is secured links 48 which are connected to the upper end of the lever 38 by means of a bolt 49, a bolt 50 connecting the link 48 and bell crank 44.

In the operation of the device a splice bar 21 is placed in position upon the table 18, the machine being in the position shown in Fig. 1 with the slotting head 11 elevated. As the head descends, carrying with it the slotting tools, the disk 35 is rotated so that the cam surface of the disk 35 pushes the upper end of the pivotally mounted lever outward, so that the push rod 24 is pushed inwardly, pushing the splice bar 21 up against the stop 36. The splice bar 21 is held against the stop 36 during the slotting operation and as soon as the slotting head 11 ascends the lever 27 goes back to its normal position because of the action of the push rod 24 and bolt 30, and the splice bar is released and can be removed from the table by means of tongs or in any other suitable manner and a new splice bar placed in position on the die blocks.

In the modified form of the invention shown in Figs. 3 and 4 the operation is precisely the same as that described in Figs. 1 and 2. The eccentric member 42 is so positioned that it acts upon the bell crank 44, which in turn has its motion communicated through the bolt 30 and push rod 24 so as to position the splice bar 21 into proper place where it is held during the slotting operation.

In order that different length splice bars may be handled I provide push rods of different lengths, and also the stop 36 may be adjusted to different positions, as desired.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In combination with a punch press, of a pivotally mounted member thereon, means at the upper end of said press and connected with the operating mechanism of the punch press whereby the member is actuated, and means at the lower end of said lever for pushing a work piece into position under the punching dies.

2. In combination with a punch press, a pivotally mounted member, means at the upper end of said member for actuating the same, a push rod mounted upon the work table of the punch press and adapted to co-act with the pivotally mounted member whereby a work piece is positioned under the punching dies.

3. In combination with a punch press, a lever pivotally mounted upon said press, means at the upper end of said lever for actuating the same, a holder secured to the said press, a push rod carried by said holder and adapted to co-act with the lower end of said lever, and a stop secured to the punch press whereby a work piece is properly positioned under the punching dies.

4. In combination with a punch press, of a pivotally mounted lever, a cam member, operative connections between the said cam member and the lever, a holder secured to the punch press, a push rod carried by said holder and actuated by the said lever, and a stop adapted to engage the end of a splice bar when pushed into position under the punching dies.

5. In combination, a punch press, a pivotally mounted lever thereon, a cam member actuated by the driving shaft of said punch press, connecting means between said cam member and the upper end of said lever, a spring mounted push rod carried by the said lever at its lower end, a co-acting spring mounted push rod mounted upon the bed of the punch press, and means mounted upon the bed of the punch press for limiting the movement of the work piece.

6. In combination with a punch press, of a pivotally mounted lever, a cam disk mounted upon a rotatable shaft adapted to co-act with the upper end of said lever, a holder secured to the table of said punch press, a pair of co-acting push rods carried by the lower end of said lever and by said holder, springs carried by said push rod members whereby the upper end of the said lever is kept in contact with the said disk, and means secured to the bed plate of the punch press whereby a splice bar is held in proper position during the slotting operation.

7. In combination, a punch press, a pivotally mounted lever thereon, means whereby the lever is actuated by the driving shaft of said punch press, a spring mounted push rod carried by said lever at its lower end, a second push rod co-acting with said first mentioned rod and in abutting engagement therewith mounted upon the said punch press bed, and a stop whereby the movement of the splice bar upon the said punch bed is limited, the movement of the said lever being in timed relation with the movement of the punching dies of the press.

8. In combination, a punch press, a lever pivotally mounted upon said punch press, a cam member secured to the driving shaft of said press, a pair of spring mounted push rods in abutting engagement with each other, one of said rods being carried by said lever, and the other mounted upon the punch press, a stop mounted upon the bed of the punch press, and operative connections between the cam member and said lever whereby a splice bar is pushed under the punch dies by the push rods and held during the punching operation.

Signed at Joliet, Illinois, this 1st day of October, 1919.

JULIUS A. DYBLIE.